United States Patent Office 3,556,717
Patented Jan. 19, 1971

3,556,717
CONVERSION OF MONOAMMONIUM ALUMINUM TETRAFLUORIDE TO CRYOLITE
Gustave E. Kidde, 294 California Terrace,
Pasadena, Calif. 91105
No Drawing. Filed Feb. 25, 1969, Ser. No. 802,274
Int. Cl. C01f 7/50, 7/54
U.S. Cl. 23—88                                6 Claims

ABSTRACT OF THE DISCLOSURE

This disclosure describes a process for the conversion of monoammonium aluminum tetrafluoride ($NH_4AlF_4$) to cryolite through a reaction with ammonium fluoride in a basic solution.

BACKGROUND OF THE INVENTION

The field of the invention is hydrometallurgy and more specifically relates to reactions of aluminum-containing compounds in a slurry. The reactions disclosed yield synthetic cryolite which may be then used in the electrolytic reduction of aluminum oxide to produce aluminum.

Processes for production of aluminum fluoride are disclosed in my copending application Ser. No. 669,908, filed Sept. 22, 1967, which is incorporated herein by reference. Basic problems of hydrometallurgical processes for aluminum compounds have included low yields, lengthy reaction times and a large number of individual steps.

SUMMARY OF THE INVENTION

Aluminum salts such as ammonium alum may be readily converted to monoammonium aluminum tetrafluoride ($NH_4AlF_4$) and I have discovered that monoammonium aluminum tetrafluoride ($NH_4AlF_4$) may be converted to synthetic cryolite by reacting it in an aqueous slurry with ammonium fluoride and a base. I have found that sodium hydroxide or sodium carbonate are particularly useful. The reaction is complete in several hours and yields as high as 96% were achieved.

The basic equations are:

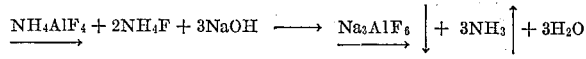

or

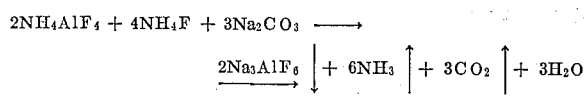

It is a primary object of my invention to provide a process for the production of synthetic cryolite.

It is another important object of my invention to provide a hydrometallurgical process for the production of cryolite which will result in a high yield.

It is yet another object of my invention to provide a process for the production of synthetic cryolite from monoammonium aluminum tetrafluoride ($NH_4AlF_4$).

It is yet another object of my invention to provide a hydrometallurgical process for the production of synthetic cryolite which may be carried out at atmospheric pressure in a water slurry.

DESCRIPTION OF THE PREFERRED EMBODIMENTS

Monoammonium aluminum tetrafluoride ($NH_4AlF_4$) may be prepared by reactions with aluminum salts. For instance, aluminum alum may be reacted with ammonium fluoride in a water slurry and the resulting reactions product is a mixture of monoammonium aluminum tetrafluoride ($NH_4AlF_4$) and triammonium aluminum hexafluoride [$(NH_4)_3AlF_6$].

Based on the amount of monoammonium aluminum tetrafluoride ($NH_4AlF_4$), the amount of ammonium fluoride and base may be calculated from the stoichiometric amounts of the above reactions. Any triammonium aluminum hexafluoride [$(NH_4)_3AlF_6$] present will not require any additional ammonium fluoride.

The ammoniumfluoroaluminate and ammonium fluoride are agitated in a water slurry and base such as sodium hydroxide or sodium carbonate is added. In the case of sodium hydroxide, the reaction is exothermic and ammonia is evolved. When sodium carbonate is used carbon dioxide is also evolved. The reacting mass is then heated to near the boiling point of water and maintained for several hours until no ammonia can be detected either by odor or by litmus paper. The resulting slurry is synthetic cryolite and is separated from the slurry by means such as filtration and drying. The slurry should be heated above about 77° C.

The following specific examples are illustrative of the process of my invention, but it is to be understood that the invention is not to be limited to the details thereof.

EXAMPLE I

The following experiment used commercial reactants such as would be used in a commercial process for the production of synthetic cryolite from an aluminum salt and ammonium fluoride and where the intermediate ammoniumfluoroaluminate is prepared by using a F/Al ratio of 2.9/1.0 by weight.

One hundred eighty (180) pounds of water were pumped into a 27" x 60" flat bottomed 316 stainless steel tank equipped with an agitator and polyethylene sparger nozzle and then 115 pounds of $NH_4F \cdot HF$ were added and allowed to dissolve. The sparger was then connected to an hydrous ammonia cylinder standing on a scale and 35 pounds of $NH_3$ were added to convert the $NH_4F \cdot HF$ to $NH_4F$. The addition took 20 minutes. Then 375 pounds of ammonium alum (13.25% $Al_2O_3$) were added in 35 minutes and the whole mass allowed to agitate for 60 minutes. The slurry was then transferred to a 3' x 3' flat vacuum pan filter and the strong filtrate removed and the six (6) water washes were applied. Each wash was weighed and analyzed. The final washed cake was sampled for moisture determination and for X-ray analysis. The wet cake weighed 177 pounds and has 34.5% water which gives 116 pounds of dry cake. The other analyses were:

(1) Dry cake

Percent fluorine _____ 62.2
Percent ammonia _____ 15.3
Percent monoammoniumfluoroaluminate (by
  X-ray _____ 90.0
Percent triammoniumfluoroaluminate (by
  X-ray _____ 10.0

(2) FILTRATE ANALYSES

| Constituent | Weight, lbs. | Percent F | Percent NH₃ |
|---|---|---|---|
| Strong filtrate | 505 | 0.9 | 10.32 |
| First wash | 250 | 0.4 | 7.59 |
| Second wash | 254 | 0.2 | 3.84 |
| Third wash | 257 | | 1.69 |
| Fourth wash | 289 | | 0.55 |
| Fifth wash | 319 | | 0.20 |
| Sixth wash | 252 | | |

(3) Material balances (a) Fluorine — Pounds
 (1) Fluorine—in _____ 76.8
 (2) Fluorine—out—cake _____ 72.1
 (3) Fluorine—washes _____ 6.0
 (4) Fluorine accounted for _____ [1] 78.1

(b) Ammonia
 (1) Ammonia—in
  Ammonium bifluoride _____ 49.0
  Anhydrous ammonia _____ 35.0
  Ammonium alum _____ 16.7

Total _____ 100.7

[1] Equal 102.0%.

(2) Ammonia—out
  Dry cake _____ 17.8
  Strong filtrate _____ 52.0
  First wash _____ 19.0
  Second wash _____ 9.8
  Third wash _____ 4.4
  Fourth wash _____ 1.6
  Fifth wash _____ 0.6
  Sixth wash _____ -----

Total _____ [2] 105.2

[2] Equals 105.0%.

(c) Alumina
  In _____ 50.0
  Out _____ [3] 46.0

[3] Equals 92%.

The reactor was filled with 300 lbs. water and then 49 lbs. of NH$_4$F·HF and 15 lbs. NH$_3$ were added. Then the wet cake was returned and the whole agitated until a uniform suspension had been obtained. To this suspension 108 lbs. of flake caustic soda were added over a 20 minute period. Violent evolution of ammonia ensued and some slurry ran over the side of the tank.

A stainless steel steam sparger was inserted and the whole heated for five (5) hours at which time the slurry was transferred to the flat filter for filtration and washing. The cake was dried, weighed and analyzed.

Wet cake—250 lbs.
Dry cake—182 lbs.
Percent moisture—27.0%.
Percent F—54.1%.
X-ray—100.0% cryolite.

Material balance—Synthetic cryolite phase
 Pounds
(a) Fluorine—in
 (1) Fluorine in cake _____ 72.1
 (2) Fluorine in NH$_4$F·HF _____ 32.6
 (3) Total—in _____ 104.7

(4) Fluorine-cryolite _____ [4] 99.0

[4] Equals 94.6% accounted for.

The overall fluorine balance shows 99 lbs. in product out of a total of 109.3 lbs. used or an overall process yield of 90.7%. The alumina yield in product was 88.5%.

EXAMPLE II 100 grams of an ammoniumfluoroaluminate containing 80% NH$_4$AlF$_4$ and 20% (NH$_4$)$_3$AlF$_6$ were added, at ambient temperature, to a solution containing 300.0 grams of water and 50.0 grams of reagent grade ammonium fluoride. The beaker was a 1,000 ml. Teflon beaker and mechanical agitation was used to keep all solids in suspension. The beaker was placed in a water bath, agitation was continued and 94.0 grams of reagent grade sodium hydroxide were added. Heavy ammonia evolution took place immediately and when all sodium hydroxide had been added the temperature had risen from 39° C. to 76° C. External heat was applied to the water bath and the slurry held at 90°–96° C. for three (3) hours. At that time no ammonia could be detected by odor or litmus paper. The level in the beaker was maintained by addition of water. The hot slurry was filtered on a Buechner funnel and the cake washed with 125 ml. of hot water. The wet cake weighed 218.3 grams and was dried at 105° C. until constant weight. The dry cake weighed 154.0 grams and contained 55.1% F. and 0.1% NH$_3$. X-ray diffraction analysis showed the product to be 100% cryolite. No chiolite was present. This shows a 96% yield for conversion from NH$_4$AlF$_4$ to Na$_3$AlF$_6$.

EXAMPLE III 100.0 grams of an ammoniumfluoroaluminate containing 91% NH$_4$AlF$_4$ and 9% (NH$_4$)$_3$AlF$_6$ were added, at ambient temperature, to a 1,000 ml. Teflon beaker containing 300 grams of water and 56.0 grams of reagent grade NH$_4$F. The beaker was placed in a water bath and agitated mechanically. Then 102.0 grams of reagent grade sodium hydroxide were added slowly. Slurry temperature rose from 33° C. to 73° C. and ammonia was evolved. After all the sodium hydroxide had been added heat was applied to the water bath and slurry temperature was held at about 90° C. for three (3) hours at which time no more ammonia could be detected. The hot slurry was filtered and washed with 100 ml. hot water. The wet cake weighed 202.4 grams and the dry cake weighed 158.2 grams. Cake analysis showed 54.3% F. and less than 0.1% NH$_3$. X-ray diffraction showed 100% cryolite. Yield was 95%.

EXAMPLE IV 100.0 grams of an ammoniumfluoroaluminate containing 80% NH$_4$AlF$_4$ and 20% (NH$_4$)$_3$AlF$_6$ were slurried in a solution containing 300.0 grams water and 50.0 grams of reagent grade NH$_4$F. The vessel was a 1,000 ml. Teflon beaker in a water bath and mechanical agitation was used to keep the slurry in suspension. 127 grams of reagent grade sodium carbonate were added slowly and, after addition was complete, the water bath was heated and the slurry maintained at 90° C. or more for seven (7) hours, at which time no ammonia could be detected by odor or by litmus paper. The slurry was filtered, washed and the wet cake weighed 201.0 grams. The wet cake was dried at 105° C. and, after drying, weighed 152.1 grams. X-ray diffraction showed the dry material to be 100% cryolite. Yield was about 94%.

The foregoing examples are not to be taken as limiting the scope of my invention but rather are merely illustrative of various embodiments. The scope of this invention is, therefore, limited only by the lawful scope of the claims which follow.

I claim:
1. A hydrometallurgical process for the production of synthetic cryolite from monoammonium aluminum tetrafluoride, comprising:
 dissolving ammonium fluoride in an aqueous slurry of monoammonium aluminum tetrafluoride at a molar ratio of two mols of ammonium fluoride per mol of monoammonium aluminum tetrafluoride;
 adding about a stoichiometric amount of a compound selected from the group consisting of sodium hydroxide and sodium carbonate to said slurry;
 heating said slurry to from about 77° C. to 100° C.;
 maintaining said slurry until substantially no further ammonia is evolved; and
 removing the resulting slurry of synthetic cryolite.
2. The process of claim 1, wherein said compound is sodium hydroxide.
3. The process of claim 1, wherein said compound is sodium carbonate.
4. A hydrometallurgical process for the production of synthetic cryolite from ammonium alum, comprising:
 adding the ammonium alum to an aqueous solution of ammonium fluoride to give a fluorine to aluminum ratio of about 2.9 to 1;

agitating the resulting slurry until the reaction is complete;

removing the resulting monoammonium aluminum tetrafluoride and triammonium aluminum hexafluoride;

forming an aqueous slurry of the resulting monoammonium aluminum tetrafluoride and triammonium aluminum hexafluoride;

dissolving in said slurry about two mols of ammonium fluoride per mol of monoammonium aluminum tetrafluoride present:

adding about a stoichiometric amount of a compound selected from the group consisting of sodium hydroxide and sodium carbonate;

heating the slurry to from 77° C. to 100° C.;

maintaining the slurry until no further ammonia is evolved; and removing the resulting slurry of synthetic cryolite.

5. The process of claim 4, wherein said compound is sodium hydroxide.

6. The process of claim 4, wherein said compound is sodium carbonate.

References Cited

FOREIGN PATENTS

| 238,515 | 11/1945 | Switzerland | 23—88 |
| 635,553 | 4/1950 | Great Britain | 23—88 |

OTHER REFERENCES

J. Gen. Chem. (U.S.S.R.), 1940, pp. 1547–1550.

EDWARD STERN, Primary Examiner

U.S. Cl. X.R.

23—193